SAMUEL KREWSON, OF SPRINGFIELD, OHIO.

Letters Patent No. 86,843, dated February 9, 1869.

IMPROVED GLUE-CEMENT.

The Schedule referred to in these Letters Patent and making part of the same.

*To all whom it may concern:*

Be it known that I, SAMUEL KREWSON, of Springfield, in the county of Clark, and State of Ohio, have invented a new and improved Method of Preparing Glue, in combination with certain other substances, to form an adhesive solution; and I do hereby declare that the following is a full, clear, and exact description of the same.

Take two and one-half (2½) pounds of common glue, one and one-half (1½) ounce of borax, and dissolve the same in from three to four pints of soft water, or a sufficient amount of water to make the preparation of the proper consistency.

When dissolved, add one (1) ounce of tartaric acid and one (1) ounce of pulverized chalk.

Stir the mixture, and it will then be ready for use.

By varying the amount of borax, the preparation will cause the substances to which it is applied to set, or adhere, in a greater or less time, the time required for such substances to adhere being in an inverse ratio to the quantity of borax used.

By leaving out the tartaric acid, the preparation may be used, after heating, in the same manner as ordinary preparations of glue, the chalk and borax greatly increasing the adhesive properties of the glue.

The preparation, when made according to the first formula herein given, may be preserved in a liquid form, in any close vessel, ready for use, for an indefinite period of time and may be used without the trouble of heating, causing the substances to which it is applied to adhere with greater tenacity, and making stronger and more durable joints, than can be made with any other known preparation of glue.

Substances glued together with this preparation are not affected by water or damp weather to the same extent as when glued with the ordinary preparation of glue.

In making the preparation, it is not necessary to observe the exact proportion of ingredients herein specified.

What I claim as my invention, and desire to secure by Letters Patent, is—

1. The mode of preparing glue for use, in combination with borax, tartaric acid, and chalk, substantially as and for the purpose set forth.

2. The combination of the glue, borax, and chalk, substantially as and for the purpose set forth.

In testimony whereof, I have signed my name to this specification, in the presence of two subscribing witnesses.

SAMUEL KREWSON.

Witnesses:
 JOHN McGAFFEY,
 ED. S. WALLACE.